United States Patent [19]

Schlueter, Jr.

[11] Patent Number: 4,763,158
[45] Date of Patent: Aug. 9, 1988

[54] BORON NITRIDE FILLED FUSER ROLLS

[75] Inventor: Edward L. Schlueter, Jr., Rochester, N.Y.

[73] Assignee: Xerox Corporation, Stamford, Conn.

[21] Appl. No.: 95,193

[22] Filed: Sep. 11, 1987

[51] Int. Cl.⁴ .................................. G03G 15/20
[52] U.S. Cl. .................. 355/3 FU; 355/14 FU; 219/216; 118/60; 430/99
[58] Field of Search .............. 355/3 FU, 14 FU, 3 R; 219/216; 29/132, DIG. 22; 118/59, 620, 60; 430/98, 99

[56] References Cited

U.S. PATENT DOCUMENTS

| | | | |
|---|---|---|---|
| 3,050,490 | 8/1962 | Nitzsche et al. | 260/37 |
| 3,662,446 | 5/1972 | Walls | 29/130 |
| 3,853,525 | 12/1974 | Gorman | 65/181 |
| 4,272,179 | 6/1981 | Seanor | 355/3 FU |
| 4,292,225 | 9/1981 | Theodore et al. | 260/29.1 SB |
| 4,544,696 | 10/1985 | Streusand et al. | 524/428 |
| 4,550,243 | 10/1985 | Inagaki | 355/3 FU X |
| 4,562,335 | 12/1985 | Katsuno et al. | 219/216 |
| 4,588,279 | 5/1986 | Fukuchi et al. | 355/3 FU X |
| 4,596,920 | 6/1986 | Inagaki | 219/216 |
| 4,616,917 | 10/1986 | Sakurai | 355/3 FU |

Primary Examiner—A. C. Prescott

[57] ABSTRACT

A fuser member for electrostatographic printing machine has a base member having a thermally conductive elastomer surface layer coated thereon which contains boron nitride filler particles dispersed therein in an amount to increase the thermal conductivity of the elastomer while maintaining good release characteristics of the elastomer surface.

15 Claims, 1 Drawing Sheet

BORON NITRIDE FILLED FUSER ROLLS

BACKGROUND OF THE INVENTION

The present invention relates to elastomeric fuser members for electrostatographic printing apparatus. In particular it relates to compositions having improved thermal conductivity in fuser member applications.

In electrostatographic reproducing apparatus commonly used today a photoconductive insulating member is typically charged to a uniform potential and thereafter exposed to a light image of an original document to be reproduced. The exposure discharges the photoconductive insulating surface in exposed or background areas and creates an electrostatic latent image on the member which corresponds to the image contained within the original document. Alternatively, a light beam may be modulated and used to selectively discharge portions of the charged photoconductive surface to record the desired information thereon. Typically, such a system employs a laser beam. Subsequently, the electrostatic latent image on the photoconductive insulating surface is made visible by developing the image with developer powder referred to in the art as toner. Most development systems employ developer which comprises both charged carrier particles and charged toner particles which triboelectrically adhere to the carrier particles. During development the toner particles are attracted from the carrier particles by the charged pattern of the image areas of the photoconductive insulating area to form a powder image on the photoconductive area. This toner image may be subsequently transferred to a support surface such as copy paper to which it may be permanently affixed by heating or by the application of pressure. The present invention relates to the fusing of the toner image on a support.

The use of thermal energy for fixing toner images onto a support member is well known. In order to fuse electroscopic toner material onto a support surface permanently by heat, it is necessary to elevate the temperature of the toner material to a point at which the constituents of the toner material coalesce and become tacky. This heating causes the toner to flow to some extent into the fibers or pores of the support member. Thereafter, as the toner material cools, solidification of the toner material causes the toner material to be firmly bonded to the support.

Several approaches to thermal fusing of electroscopic toner images have been described in the prior art. These methods include providing the application of heat and pressure substantially concurrently by various means: a roll pair maintained in pressure contact; a flat or curved plate member in pressure contact with a roll; a belt member in pressure contact with a roll; and the like. Heat may be applied by heating one or both of the rolls, plate members or belt members. The fusing of the toner particles takes place when the proper combination of heat, pressure and contact time are provided. The balancing of these parameters to bring about the fusing of the toner particles is well known in the art, and they can be adjusted to suit particular machines or process conditions.

One approach to thermal fusing of toner material images onto the supporting substrate has been to pass the substrate with the unfused toner images thereon between a pair of opposed roller members at least one of which is internally heated. During operation of the fusing system of this type, the support member to which toner images are electrostatically adhered is moved through the nip formed between the rolls with the toner image contacting the fuser roll thereby to affect heating of the toner images within the nip. Typical of such fusing devices are two roll systems wherein the fusing roll is coated with an abhesive material, such as silicone rubber or other low surface energy elastomer as, for example, tetrafluoroethylene resin sold by E. I. DuPont de Nemours under the tradename Teflon. The silicone rubbers which can be used as the surface of the fuser member can be classified into three groups according to the vulcanization method and temperature, i.e. room temperature vulcanization silicone rubber hereinafter referred to as RTV silicone rubber, liquid injection moldable or extrudable silicone rubber, and high temperature vulcanization type silicone rubber, referred to as HTV rubber. All these silicone rubbers or elastomers are well known in the art and are commercially available.

During operation of a fusing system in which heat is applied to cause thermal fusing of the toner particles onto a support, both the toner image and the support are passed through a nip formed between the roll pair, plate or belt members. The concurrent transfer of heat and the application of pressure in the nip effects the fusing of the toner image onto the support. It is important in the fusing process that no offset of the toner particles from the support to the fuser member takes place during normal operations. Toner particles offset onto the fuser member may subsequently transfer to other parts of the machine or onto the support in subsequent copying cycles, thus increasing the background or interfering with the material being copied. The so called "hot offset" occurs when the temperature of the toner is raised to a point where the toner particles liquify and a splitting of the molten toner takes place during the fusing operation with a portion remaining on the fuser member. The hot offset temperature or degradation of the hot offset temperature is a measure of the release property of the fuser roll, and accordingly it is desired to provide a fusing surface which has a low surface energy to provide the necessary release. While many materials may initially function with good release properties with continued use, they tend to be contaminated with paper fibers, debris and toner as a result of hot offset of toner, thereby increasing the surface energy of the roll and perpetuating the destruction of release performance. In addition, once the roll becomes contaminated the hot offset temperature starts to reduce and may reach a level near or below the minimum temperature necessary to fuse the toner image thereby leading to both incomplete fusing of the toner image and offsetting of the toner image to the fuser roll. Once the fuser roll begins to be contaminated, contaminates are likely to be transferred to the pressure roll because it is generally of higher surface energy material.

It has also been proposed to provide toner release agents such as silicone oil, in particular, polydimethyl silicone oil, which is applied on the fuser roll to a thickness of the order of about 1 micron to act as a toner release material. These materials possess a relatively low surface energy and are suitable for use in the heated fuser roll environment. In practice, a thin layer of silicone oil is applied to the surface of the heated roll to form an interface between the roll surface and the toner image carried on the support material. Thus, a low surface energy, easily parted layer is presented to the toners that pass through the fuser nip and thereby prevents toner from offsetting to the fuser roll surface.

In addition, further difficulties may be encountered in such a fusing system in that the operational latitude may be unduly restricted. By operational latitude, it is intended to mean the difference in temperature between the minimum temperature required to fix the toner to the paper, the minimum fix temperature, and the temperature at which the hot toner will offset to the fuser roll, the hot offset temperature. Accordingly, as the hot offset temperature is reduced, this latitude is restricted. Typically, the fusing latitude must be maintained greater than 40° F. and preferably of the order of 60° F. to 70° F. This is necessary for modern day reproducing flexibility which requires the capability to use many different types and weights of paper, different toner materials and amounts thereof as well as respond to use in a wide variety of speeds, and other operational conditions. It is also true that greater latitude is required to provide high quality copies particularly where toner pile height is increased to provide improved copy quality.

Typically fuser members such as the fuser roll have a thin elastomeric surface layer applied to a metallic cylindrical sleeve such as aluminum which is heated by a heating element disposed in the center of the aluminum sleeve. Since the fusing temperature is of the order of about 400° F., the design of the fuser roll is such as to minimize power requirements to maintain the fusing temperature at the surface of the elastomer layer. Accordingly, the elastomer layer is generally designed to be as thin as possible and typically has substantial quantities of thermally conductive filler such as alumina, iron oxide and others added thereto. The thermally conductive filler increases the thermal conductivity of the elastomer layer thereby minimizing the thermal barrier to heat radiating from inside the fuser member to the outermost layer of the elastomer and reducing the power requirements. While the fillers such as alumina and silica are effective in increasing thermal conductivity of the elastomer layer since these particulate materials are relatively high surface energy materials when incorporated in the elastomer layer, the release properties of the elastomer layer are gradually degraded with continuing use. As a result, the hot offset temperature is reduced and the fusing latitude may also be reduced with time.

Accordingly, there is a continuing need for a fuser member having an elastomer surface fusing layer thereon of high thermal conductivity and which maintains good release characteristics on the elastomer surface.

PRIOR ART

U.S. Pat. No. 3,050,490, Nitzsche et al. disclose the use of boron nitride in silicone elastomers to control the degree of self-adhesion of the vulcanized silicone rubber. The compositions are described as being useful for applications for self-adhering silicone rubber such as electrical insulating, joint sealants, packing rings, laminating materials, etc.

U.S. Pat. No. 4,292,225 to Theodore et al. discloses a thick highly thermally conductive elastomer which comprises an organopolysiloxane with a viscosity modifier, silica and a thermally conductive boron refractory powder preferably boron nitride which aids thermal conductivity. These highly filled thermally conductive elastomers are described as being useful in ring gear assemblies.

SUMMARY OF THE INVENTION

In accordance with the present invention, a fuser member for use in electrostatographic printing machines has a base support member having a thermally conductive elastomeric surface layer coated thereon which elastomeric surface layer contains boron nitride filler particles dispersed therein in an amount to increase the thermal conductivity of the elastomer while maintaining good release characteristics of the elastomer surface.

In a further aspect of the present invention, the elastomer is a cured polyorganosiloxane, or fluoroelastomer.

In a further aspect of the present invention, the boron nitride particles are present in an amount up to about 100 parts by weight per 100 parts by weight of the elastomer.

In a further aspect of the present invention, the boron nitride particles have an average diameter of from about 5 to 15 microns.

In a further aspect of the present invention, the base member is a metallic cylindrical roll and the elastomeric surface layer is from about 0.1 mm to about 2.5 mm thick and the cylindrical roll has a heating element disposed within its center.

According to the present invention and contrary to the general expectations of the prior art, when adding a high surface energy filler to an elastomer composition, it has surprisingly been found that boron nitride is unique in obtaining an elastomer with high thermal conductivity at relatively low filler loadings while maintaining good release properties on the elastomer fusing surface. While the increase in thermal conductivity by the addition of boron nitride filler particles might be expected, it was indeed unexpected that the release stripping performance could be maintained. While the reason for this is not thoroughly understood and not wishing to be bound to any particular theory, it is believed that the hexagonal crystal structure of boron nitride, with a shear plane similar to graphite may act in some fashion as a dry lubricant providing a lubricity to the elastomer surface.

A further significant embodiment of the present invention involves a unique filler system combining the irregularly shaped, low hardness boron nitride filler particles having a particle size of from about 5 to about 15 microns with another low hardness filler material of smaller sub-micron size such as iron oxide to optimize filler packing efficiency in the elastomer. Up to 100 parts by weight of such submicron filler may be added per 100 parts by weight elastomer.

DETAILED DESCRIPTION OF THE INVENTION

Figure 1:
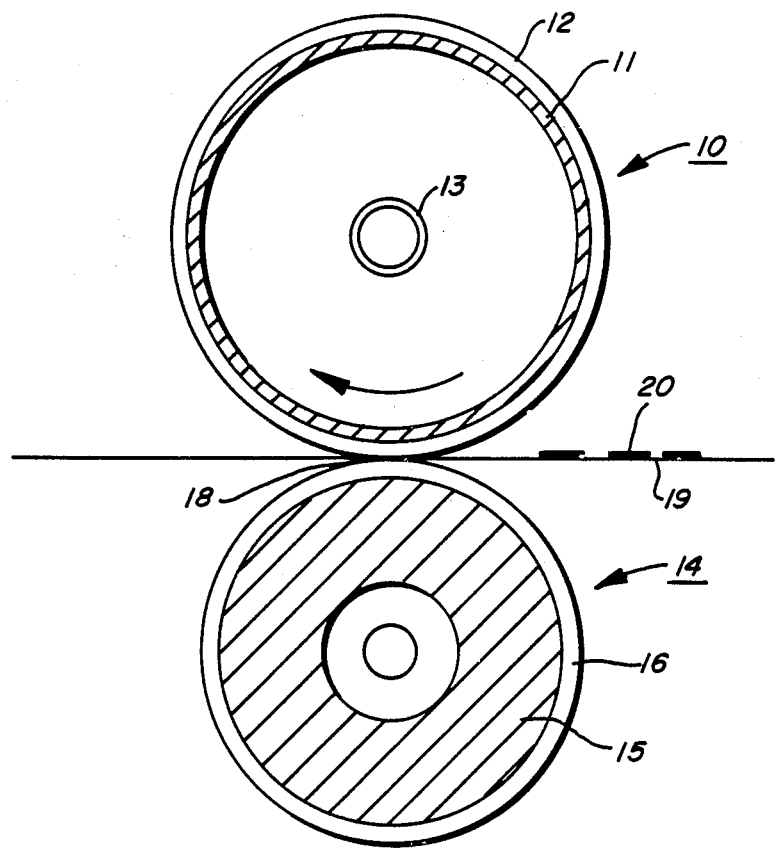
FIG. 1 is a sectional view of a dry roll fuser system which may use the fuser roll of the present invention.

FIG. 1 shows a fuser roll 10 useful for use in the present invention. Although the fuser member shown in FIG. 1 is in the form of a roll, it is to be understood that the present invention is applicable to fuser members of other shapes, such as plates or belts. In FIG. 1, the fuser roll 10 is composed of a core 11 having coated thereon a thin layer 12 of the elastomer according to the present invention. The core 11 may be made of various metals such as iron, aluminum, nickel, stainless steel, etc., and various synthetic resins. Aluminum is preferred as the material for the core 11, although this is not critical. The core 11 is hollow and a heating element 13 is generally positioned inside the hollow core to supply the heat for the fusing operation. Heating elements suitable for this purpose are known in the prior art and may comprise a quartz heater made of a quartz envelope having a tungsten resistance heating element disposed internally therein. The method of providing the necessary heat is not critical to the present invention, and the fuser member can be heated by internal means, external means or a combination of both. All heating means are well known in the art for providing sufficient heat to fuse the toner to the support. The composition of layer 12 will be described in detail below.

The fuser roll 10 is shown in a pressure contact arrangement with a backup or pressure roll 14. The pressure roll 14 comprises a metal core 15 with a layer 16 of a heat-resistant material. In this assembly, both the fuser roll 10 and the pressure roll 13 are mounted on shafts (not shown) which are biased so that the fuser roll 10 and pressure roll 14 are pressed against each other under sufficient pressure to form a nip 18. It is in this nip that the fusing or fixing action takes place. It has been found that the quality of the copies produced by the fuser assembly is better when the nip is formed by a relatively hard and unyielding layer 16 with a relatively flexible layer 12. In this manner, the nip is formed by a slight deformation in the layer 12 due to the biasing of fuser roll 10 on the pressure roll 14. The layer 16 may be made of any of the well known materials such as polytetrafluoroethylene, polyfluoroalkoxy resin, fluorinated ethylene-propylene copolymer or silicone rubber.

A sheet of support material 19 such as paper bearing thereon toner image 20 passes between the fuser roll 10 and the pressure roll 14 and the toner image thereon is fused.

Figure 2:
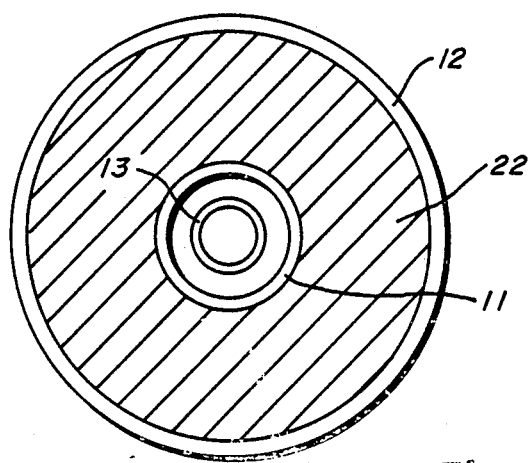
FIG. 2 is a cross-sectional view of an alternative embodiment of the fuser roll.

FIG. 2 illustrates an alternative embodiment wherein intermediate the thin layer 12 and the supporting core 11 is an intermediate high temperature resistant elastomeric layer which may be of any suitable material. Typical materials which can be used for this intermediate layer include HTV silcone rubbers, addition curable silicone rubbers, or copolymer of vinylidene fluoride and hexafluoropropylene and terpolymers and tetrapolymers based on vinylidene fluoride, hexafluoropropylene and tetrafluoroethylene available from E.I. DuPont de Nemours & Company under the trademark Viton.

The elastomers which may be used in accordance with the present invention must be heat stable elastomers or resin materials which can withstand elevated temperatures generally from about 90° C. up to about 200° C. or higher depending upon the temperature desired for fusing the toner to the substrate. The elastomers used should resist degradation or attack by any release agent which is used to promote release of the molten or tackified toner from the fuser member. Typical elastomers which may be used in accordance with the present invention are the polyorganosiloxanes, fluoro silicone elastomers and fluoro elastomers such as vinylidene fluoride baked elastomers.

A preferred group of elastomers include the polyorganosiloxanes, curable silicone elastomers such as the commercially available condensation curable and addition curable materials. Typical curable polyorganosiloxanes are represented by the formula:

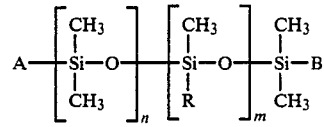

wherein R is hydrogen or substituted or unsubstituted alkyl, alkenyl or aryl having less than 19 carbon atoms, each of A and B may be any of methyl, hydroxy or vinyl groups and $$0 < m/n < 1 \text{ and } m+n > 350.$$

The condensation curable polyorganosiloxanes are typically silanol terminated polydimethylsiloxanes such as:

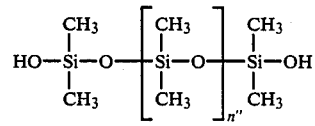

where n″ is 350 to 2700. The terminating silanol groups render the materials susceptible to condensation under acid or mild basic conditions and are produced by kinetically controlled hydrolysis of chlorosilanes. Room temperature vulcanizable (RTV's) systems are formulated from these silanol terminated polymers with a molecular weight of 26,000 to 200,000 and they may be crosslinked with small quantities of multifunctional silanes which condense with the silanol group. Crosslinking agents which are suitable for purposes of the present invention include esters of orthosilisic acid, esters of polysilic acid and alkyl trialkoxy silanes. Specific examples of suitable crosslinking agents for the condensation cured materials include tetramethylorthosilicate, tetraethylorthosilicate, 2-methoxyethylsilicate tetrahydrofurfurylsilicate, ethylpolysilicate and butylpolysilicate, etc. During the crosslinking reaction, an alcohol is typically split out leading to a crosslinked network. We particularly prefer to use condensed tetraethylorthosilicate as a crosslinking agent in the composition of the invention. The amount of the crosslinking agent employed is not critical as long as sufficient amount is used to completely crosslink the active end groups on the disilanol polymer. In this respect, the amount of crosslinking agent required depends on the number average molecular weight of the disilanol polymer employed. With higher average molecular weight polymer there are fewer active end groups present and thus a lesser amount of crosslinking agent is required and vice versa. When excess amounts of crosslinking agents are used, the excess is easily removed from the cured composition. Generally, with the preferred alpha, omega hydroxy polydimethyl siloxane having a number average molecular weight of between about 26,000 to about 100,000 we have found that between about 6 to 20 parts by weight of condensed tetraethylorthosilicate per 100 parts by weight of disilanol polymer to be suitable.

A particularly preferred embodiment of the present invention relates to a liquid addition cured polyorganosiloxanes achieved by using siloxanes containing vinyl groups at the chain ends and/or scattered randomly along the chain along with siloxanes having anything more than two silicone hydrogen bonds per molecule. Typically these materials are cured at temperatures of from about 100° C. to 250° C.

Typical materials are represented by the formula:

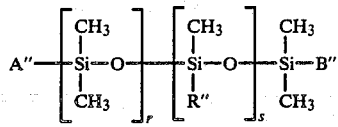

where A", B" and R" are methyl or vinyl provided the vinyl functionality is at least 2, $$0 < s/r < 1, \ 350 < r+s < 2700.$$

By the term the vinyl functionality is at least 2 it is meant that in the formula for each molecule there must be at least a total of 2 vinyl groups in the A", B" or any of the several R" sites within the formula. In the presence of suitable catalysts such as solutions or complexes of chloroplatinic acid or other platinum compounds in alcohols, ethers or divinylsiloxanes reaction occurs with temperatures of 100° C. to 250° C. with the addition of polyfunctional silicon hydride to the unsaturated groups in the polysiloxane chain. Typical hydride crosslinkers are methylhydrodimethylsiloxane copolymers with about 15–70 percent methylhydrogen. Elastomers so produced exhibit increased toughness, tensile strength and dimensional stability. Typically, these materials comprise the addition of two separate parts of the formulation, part A containing the vinyl terminated polyorganosiloxane, the catalyst and the filler, part B containing the same or another vinyl terminated polyorganosiloxane, the crosslink moiety such as a hydride functional silane and the same or additional filler where part A and part B are normally in a ratio of one to one. During the addition curing operation the material is crosslinked via the equation $$\equiv SiH + CH_2 = CHSi \equiv \rightarrow \equiv SiCH_2CH_2Si\equiv$$

Since hydrogen is added across the double bond no offensive byproduct such as acids or alcohols is obtained.

Accordingly and by way of example in the Formula for the polyorganosiloxane typical substituted alkyl groups include alkoxy and substituted alkoxy, chloropropyl, trifluoropropyl, mercaptopropyl, carboxypropyl, aminopropyl and cyanopropyl. Typical substituted alkoxy substituents include glycidoxypropyl, and methacryloxypropyl. Typical alkenyl substituents include vinyl and propenyl, while substituted alkenyl include halogen substituted materials such as chlorovinyl, bromopropenyl. Typical aryl or substituted groups include phenyl and chlorophenyl. Hydrogen, hydroxy, ethoxy and vinyl are preferred because of superior crosslinkability. Methyl, trifluoropropyl and phenyl are preferred in providing superior solvent resistance, higher temperature stability and surface lubricity. The ratio of

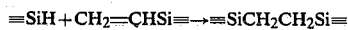

m/n being between 0 and 1 identifies the polyorganosiloxane as a copolymer and the sum of m+n being greater than 350 identifies it as an elastomeric material.

The crosslinking agent used in the composition is for the purpose of obtaining a material with sufficient crosslink density to obtain maximum strength and fatigue resistance. The amount of crosslinking agent employed is not critical as long as the amount used is sufficient to sufficiently crosslink the active groups of the polymer used.

Crosslinking catalysts are well known in the art include among others, stanneous octoate, dibutyltindilaurate, dibutyltindiacetate and dibutyltindicaproate for the condensation cured polyorganosiloxanes. The amount of catalysts employed is not critical however, too small an amount of catalyst may lead to a very small reaction which is impractical. On the other hand, excessive amounts of catalysts may cause a breakdown of the crosslinked polymer network at high temperatures to yield a less crosslinked and weaker material thus adversely affecting the mechanical and thermal properties of the cured material.

Another group of preferred elastomers useful in the present invention are the fluoroelastomers and the most preferred fluoroelastomers are the vinylidene fluoride-based fluroelastomers which contain hexafluoropropylene as a comonomer. Two of the most preferred fluoroelastomers are a class of copolymers of vinylidene fluoride and hexafluoropropylene known commercially as Viton A and a class of terpolymers of vinylidene fluoride, hexafluoropropylene and tetrafluoroethylene known commercially as Viton B. Viton A and Viton B and other Viton designations are trademarks of E. I. DuPont de Nemours & Company. Mixtures of the foregoing, vinylidene fluoride-based fluoride elastomers with tetrafluoroethylene with silicone rubber and fluorosilicone rubber, may also be compounded. The molecular weight of these elastomers may vary from a low of about 1,000 to a high of about 200,000 with more preferred embodiments of vinylidene fluoride based fluoroelastomers having a molecular weight range of about 50,000 to about 100,000. Typically, these fluoroelastomers can be cured by a nucleophilic addition cure of crosslinking agent or agents as is well known in the art with a bisphenol crosslinking agent and an organophosphonium salt accelerator as is described in greater detail in U.S. Pat. No. 4,272,179 to Seanor.

The boron nitride filler particles are white crystals and have a hexagonal platey structure resembling that of graphite. They are not abrasive, but are temperature resistant and exhibit high thermal conductivity. They are commercially available in several grades and sizes. Typical suitable materials include those available from Sohio Engineering Materials Co. under the trademark designation Combat SHP-40 and SHP-325 which are high purity grades of boron nitride having different screen sizes. SHP-40 is the coarser of the two with 90% passing a 40 mesh screen and being retained on 150 mesh screen and SHP-325 having 90% of the particles pass through a 325 mesh screen. The amount of boron nitride employed in the elastomer composition can vary over a wide range up to about 100 parts of boron nitride per 100 parts of the elastomer at which point the addition of additional filler makes processing difficult. The minimum amount present in the elastomer composition should be that which will substantially increase the thermal conductivity of the elastomer while maintaining good release properties of the elastomeric surface.

Typically from about 10 to about 50 parts by weight of boron nitride for 100 parts by weight of elastomer may be used. The best balance between increased thermal conductivity in a fuser roll application while maintaining release characteristics is obtained with between 20 parts of boron nitride and 40 parts by weight of boron nitride per 100 parts of elastomer.

Another unexpected advantage in the use of boron nitride filler is in improving the structural life of a silicone elastomer fuser member used with a silicone fluid release agent and in particular a low viscosity silicone oil. It is believed that the boron nitride reduces the rate of diffusion of the silicone oil through the silicone elastomer to the substrate thereby reducing the propensity toward debonding of the elastomer from the substrate. However, the precise mechanism is not fully understood at the present time.

A particularly preferred embodiement of the present invention includes the use of additional sub-micron fillers in combination with the boron nitride. These fillers provide an additional reinforcing function to the cured elastomer by optimizing the filler packing efficiency between the sub-micron particles and the slightly larger boron nitride particles. Typical fillers of this character are low hardness iron oxide which may be added in amounts up to 100 parts by weight per 100 parts elastomer and preferably from 20 to 40 parts per 100 parts elastomer. By low hardness it is intended to define materials having a hardness less than about 2 Mohs.

Other additives or agents may be incorporated in the elastomeric composition in accordance with the present invention as along as they do not effect the integrity of the elastomer. Such agents include coloring agents, processing aids, accelerators and polymerization initiators may be used in addition to the crosslinking agents and catalysts referred to above. The boron nitride filler, alone or in combination with additional low hardness fillers, may be dispersed in the elastomer material in any suitable or convenient form and manner. It is preferably uniformly dispersed in the elastomer during compounding. For example, when the elastomer is in the form of a gum, the boron nitride and other filler may be milled into the gum prior to curing to form the elastomer. In general, the boron nitride filler and any other filler are dispersed in the elastomer by mixing with the elastomer gum or other millable form of the elastomer compound preferably prior to solution or homoginization before application to the base member. The boron nitride and any other filler present may be dispersed in the elastomer by conventional methods known to those skilled in the art. For example in a pebble mill, the boron nitride and elastomer may be compounded during which the boron nitride may be reduced in in particle size. The compounding, however, should not be carried out to such an extent that the boron nitride loses its general geometric shape.

The fuser members may then be prepared by applying the elastomer having the boron nitride and any other filler dispersed therein directly to the base member in one application or by successively applying layers of the elastomer composition to the base member. The coating is most conveniently carried out by spraying or dipping in a light solution or homogenous suspension containing the filler. Molding, extruding and wrapping are also alternative techniques which may be used to make the fuser members. Typically, the elastomeric surface layer is from about 0.1 mm to about 2.5 mm thick. When the desired thickness of elastomer composition is coated on the base member, the elastomer composition is cured and thereby fused to the base member.

The following examples further define and describe fuser members prepared according to the present invention. EXAMPLES III, IV and V are for purposes of comparison. Unless otherwise specified, all parts and percentages are by weight.

EXAMPLE I 200 grams of Rhodorsil 48V3500, 300 grams of Rhodorsil 48V750, both obtained from Rhone-Poulenc Company and both believed to contain $\alpha\omega$ hydroxypolydimethyl siloxane having viscosities of 3500 and 750 centistokes respectively, together with 150 grams of boron nitride (BN-40SHP available from Sohio Carborundum), 150 grams of iron oxide (Mapico 297 available from Columbian Chemical) together with 200 grams of methylethyl ketone were added to a pebble mill (Model O made by U.S. Stoneware Corporation) and mixed for 5 minutes at 75 RPM. To this mixture was added 75 grams of Silbond 40 an ethyl polysilicate available from Stauffer Chemical Company and mixing continued with an additional 100 grams of methyl ethyl ketone being added. The resulting mixture was milled for 24 hours at 75 rpm. To 100 grams of this mixture was added 0.45 grams of dibutyltin dilaurate catalyst and the mixture was electrostatically sprayed onto a 3" diameter aluminum substrate which had previously been prepared by degreasing with solvent and by the application of a silane (S-11 available from Emerson Cuming) to the core followed by dying in air for 30 minutes. Spraying was continued until a layer about 0.25 mm thick was obtained after which it was cured in air at room temperature for approximately 20 hours, followed by an oven post cure for 3 hours at 250° F., 3 hours at 350° F. and a final 3 hours at 450° F.

The cured fuser roll was subjected to the following oil stress test. It was first aged at 380° F. for 330 hours while 1000 cs silicone oil was applied. The fuser roll was then placed in a fusing fixture and cycled against a pressure roll (Xerox 9500) at 65 pounds per linear inch while 1000 centistokes silicone oil was applied with a donor roll. After 200 continuous hours of cyclic fatiguing running the fuser roll against the pressure roll no significant change in the roll structures was observed. The usual failure mode is an elastomer debond from the core referred to as "worm-holing" which starts initially as a small gap between the elastomer and the core which typically rapidly propogates as a spiral debond of several inches around the roll.

Test films 0.010 inch thick of the same composition produced for evaluation of other properties yielded:

Thermal conductivity—$13.75 \times 10^{-4}$ cal/cm-sec-Deg C

Youngs Modulus—1988 psi
Toughness—316 in-lbs/in$^3$
Hardness 86 Shore A
Ultimate Elongation 96%

EXAMPLE II

The procedure of EXAMPLE I is repeated except that only 115 gram each of the boron nitride and iron oxide were added to the mixture. Test films about 0.010 inch thick yielded the following results:

Thermal Conductivity—$10.5 \times 10^{-4}$ cal/cm-Sec-Deg C

Youngs Modulus—900 psi

Toughness—285 in-lbs/in$^3$
Hardness—72 Shore A
Ultimate Elongation—115%

EXAMPLE III

The procedure of EXAMPLE I is repeated except that the filler was 300 grams or iron oxide with no boron nitride present. Test films about 0.010 inches thick and Oil Stress test yielded the following results:
  Oil Stress Test—worm holing failure at 90 hours
  Thermal Conductivity—6.25 cal/cm - Sec - Deg C
  Youngs Modulus—440 psi
  Toughness—147 in-lbs/in$^3$
  Tensile strength—380 psi
  Hardness—56 Shore A
  Ultimate Elongation—88%

EXAMPLE IV

The procedure of EXAMPLE I is repeated except that 500 grams of Rhodorsil 48V3500 was used alone without any Rhodorsil 48V750 and 300 grams of iron oxide was used as filler without any boron nitride. Test films about 0.010 inch thick and oil stress test yielded the following results:
  Oil Stress Test—worm holing failure at 7 hours
  Thermal Conductivity—6.25 cal/cm-sec-DegC
  Youngs Modulus—345 psi
  Toughness—194 in-lbs/in$^3$
  Tensile Strength—346 psi
  Hardness—51 Shore A
  Ultimate Elongation—125%

EXAMPLE V

Test films about 0.010 inch thick were prepared according to EXAMPLE I of 500 grams of Rhodorsil 48V3500 75 grams of Silbond 40 and 5,65 grams of dibutyltin dilaurate. The cured elastomer had a thermal conductivity of 3.5 cal/cm-Sec-DegC.

EXAMPLES VI, VII

Two fuser rolls were made according to the formulation and procedures of EXAMPLE II, one of which had a 2 inch diameter aluminum substrate and the other had a 2½ diameter substrate. The elastomeric surface layer was 0.25 mm thick for each roll. Both rolls were tested in a xerographic machine in a fusing environment, fusing toner images onto paper substrates. In the fusing system with the 2 inch substrate a 100 centistoke silicone oil release fluid was metered onto the pressure roll for transfer to the fuser roll surface and in the system with the 2½ inch substrate a 10,000 centistoke silicone oil release fluid was applied from an impregnated web to the fuser roll surface. Both fuser systems were run for over 550,000 copies without any mechanical failure (debonding) and both maintained fusing latitude with no change in hot offset (above 400° F.) or minimum fix (about 300° F.) temperature. In addition, copy sheet stripping performance from the fuser roll remained good throughout the test, Thus according to the present invention, a fuser member having improved thermal conductivity at lower filler loadings is provided which at the same time unexpectedly maintains its good release characteristics since the hot offset temperature is not degraded. Moreover, while some increase in the modulus would be expected by the substitution of boron nitride for some of the iron oxide, (compare EXAMPLES I, III, and IV), it would not be expected to increase by a factor of 4. In addition, normally as the modulus is increased, the toughness (cyclic fatigue life) decreases. Surprisingly, however, the substitution of boron nitride for some of the iron oxide resulted in an increase in the toughness as well as a dramatic increase in modulus. The oil stress test in the EXAMPLES is of significance in showing mechanical failure in a fusing environment caused at least in part by the silicone oil penetrating or diffusing through the elastomer causing it to swell, leading to debonding.

Because of the increased thermal conductivity, when used as an internally heated roll, a lower core temperature is enabled thereby adding life to the fuser and reducing power requirements to maintain the surface temperature. Furthermore since the boron nitride is white in color, any wearing of the rubber resulting in deposition of fine particles on paper will produce a white rather than a black or grey particle on paper. In addition, since the boron nitride is not abrasive in nature wear on stripper fingers or release agent delivery systems is minimal. Finally in the normal finishing operation for a fuser roll the surface is lightly sanded which frequently produces a slightly tacky surface. With the use of boron nitride, this difficulty is not observed.

All the patents referred to herein are hereby specifically and totally incorporated by reference in their entirety into the instant specification.

While the invention has been described in detail with reference to specific and preferred embodiments, it will be appreciated that various modifications and variations will be apparent to the artisan. For example, while the invention has been shown with respect to the formation of a fuser member in the configuration of a fuser roll, it will be be equally well understood that it may be used in the configuration of a belt or pad. In addition, while the fuser member has been illustrated as a fuser roll, it may in addition be employed as pressure roll or release agent donor roller. All such modifications and embodiments as may been readily occur to one in the art are intended to be within the scope of the appended claims.

I claim:

1. A fuser member for use in an electrostatographic printing machine comprising:
   a base member having a thermally conductive elastomeric surface layer coated thereon, said elastomer surface layer containing boron nitride filler particles dispersed therein in an amount to increase the thermal conductivity of the elastomer while maintaining good release characteristics of the elastomeric surface.

2. The fuser member of claim 1, wherein said boron nitride particles are present in an amount up to about 100 parts by weight per 100 parts by weight of the elastomer.

3. The fuser member of claim 1 further including up to about 100 parts by weight of submicron filler per 100 parts by weight of elastomer.

4. The fuser member of claim 1, wherein said boron nitride particles have an average diameter of from about 5 to about 15 microns.

5. The fuser member of claim 1, wherein said elastomer is a cured polyorganosiloxane.

6. The fuser member of claim 5, wherein said polyorganosiloxane has the formula

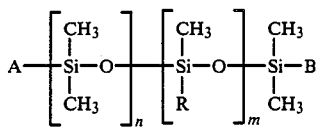

wherein R is hydrogen or substituted or unsubstituted alkyl, alknyl or aryl having less than 19 carbon atoms, each of A and B may be any of methyl, hydroxy or vinyl groups and $0 < m/n < 1$ and $m+n > 350$.

7. The fuser member of claim 1, wherein said elastomer is a fluoroelastomer.

8. The fuser member of claim 7, wherein the fluoroelastomer is poly(vinylidene fluoride-hexafluoropropylene).

9. The fuser member of claim 7, wherein the fluoroelastomer is poly(vinylidene fluoride-hexafluoropropylene)-tetrafluoroethylene.

10. The fuser member of claim 7, wherein the fluoroelastomer is a fluorosilicone.

11. The fuser member of claim 2, wherein said boron nitride is present in an amount of from about 10 to about 50 parts by weight per 100 parts by weight of elastomer.

12. The fuser member of claim 11 further including from about 20 to about 40 parts by weight of submicron iron oxide per 100 parts by weight of elastomer.

13. The fuser member of claim 12, wherein said boron nitride particles have an average diameter of from about 5 to about 15 microns.

14. The fuser member of claim 1, wherein said base member is a metallic cylindrical roll and said elastomer surface layer is from about 0.1 mm to about 2.5 mm thick.

15. The fuser member of claim 14, wherein said cylindrical roll has a heating element disposed within its center.

* * * * *